United States Patent [19]
King et al.

[11] Patent Number: 5,659,642
[45] Date of Patent: Aug. 19, 1997

[54] CONFOCAL MICROSCOPE AND ENDOSCOPE

[75] Inventors: Roger Graham King, Mount Waverley; Peter Maxwell Delaney, East Oakleigh; Martin Russell Harris, Dandenong, all of Australia

[73] Assignees: Optiscan Pty. Ltd.; Monash University, both of Australia

[21] Appl. No.: 424,320

[22] PCT Filed: Oct. 19, 1993

[86] PCT No.: PCT/AU93/00534

§ 371 Date: Apr. 20, 1995

§ 102(e) Date: Apr. 20, 1995

[87] PCT Pub. No.: WO94/10595

PCT Pub. Date: May 11, 1994

[30] Foreign Application Priority Data

Oct. 23, 1992 [AU] Australia ............... PL5462

[51] Int. Cl.$^6$ ............... G02B 6/26
[52] U.S. Cl. ............... 385/16; 385/115; 385/33; 385/45
[58] Field of Search ............... 385/15–22, 45, 385/115, 116, 119, 121, 9, 33

[56] References Cited

U.S. PATENT DOCUMENTS

| | | | |
|---|---|---|---|
| 4,410,235 | 10/1983 | Klement et al. | 385/4 |
| 4,856,863 | 8/1989 | Sampsell et al. | 385/17 |
| 5,037,173 | 8/1991 | Sapsell et al. | 385/17 |
| 5,181,134 | 1/1993 | Fatehi et al. | 385/17 |
| 5,448,661 | 9/1995 | Takai et al. | 385/17 |

FOREIGN PATENT DOCUMENTS

| | | |
|---|---|---|
| 283256 | 9/1988 | European Pat. Off. . |
| 418928 | 3/1991 | European Pat. Off. . |
| 2628543 | 12/1977 | Germany . |
| 9001202 | 12/1991 | Netherlands . |
| 89/03057 | 4/1989 | WIPO . |
| 90/00754 | 1/1990 | WIPO . |
| 91/15792 | 10/1991 | WIPO . |

*Primary Examiner*—John Ngo
*Attorney, Agent, or Firm*—Fish & Richardson P.C.

[57] ABSTRACT

A confocal microscope including a light source; an optical fiber bundle defining a plurality of optical channels for receiving light from the light source and for transmitting the light to an object and for allowing light to return from the object through the optical fiber bundle; a switch for selectively switching selected fibers in the optical fiber bundle so as to allow light to selectively be transmitted and returned through individual optical channels until an image of the object is produced; and a detector for receiving returned light from the optical fiber bundle to enable the image of the object to be produced.

10 Claims, 3 Drawing Sheets

CONFOCAL MICROSCOPE AND ENDOSCOPE

This invention relates to a microscope and more particularly to a microscope using the principal of confocal microscopy.

The principal of confocal microscopy was disclosed in U.S. Pat. No. 3,013,467 to Minsky in 1957. With confocal microscopy, a point or spot (which my be diffraction-limited) within an object is illuminated and only light from that point is imaged, e.g. via a pin hole detector. By scanning the spot across a plane (e.g. with a translucent object) a clear image ("optical section") my be obtained.

International patent applications PCT/AU89/00298 and PCT/AU91/00129 describe the design of confocal microscopes which instead of a pin hole (or equivalent) of a conventional confocal microscope use an optical fiber or fiber bundle, thus allowing the distal end to be more freely mobile, transportable and miniaturisable.

The present invention relates to an improvement to confocal microscopes of the type described in the above mentioned International applications and which are particularly suited to produce images inside of the living body of animals or humans.

The invention may be said to reside in a confocal microscope comprising:

a light source;

an optical fiber bundle for receiving light from the light source and for transmitting the light to an object;

and for allowing light to return from the object through the optical fiber bundle;

switching means for selectively switching selected fibers in the optical fiber bundle so as to allow light to selectively be transmitted and returned through respective fibers in the optical fiber bundle; and a detector for receiving returned light from the optical fiber bundle to enable an image of the object to be produced.

The use of switching means which enables the individual fibers in the bundle to be selectively switched to allow light to be transmitted through them enables selected fibers to be switched in sequence so that light is scanned across the focal plane on or within the object and light returning confocally from the object can be detected virtually instantaneously on its return from the object. Another alternative which could be particularly useful for real time imaging of fluorescent objects, is to generate an identical pattern of switching of the switch means which lags the original pattern so that light may be detected confocally a short time after it has illuminated the object. This is because peak fluorescence occurs at a time after illumination of an object.

Preferably the switching means comprises a plurality of switchable optical fiber or waveguide tree couplers, the plurality of tree couplers having a first end which receives light from a first light path and a plurality of second ends which are coupled to or integral with respective fibers of the fiber bundle.

In a further embodiment the switching means comprises a plurality of switches in the respective fibers of the optical fiber bundle.

In this embodiment of the invention an optical element is provided at an image end of the optical fiber bundle for simultaneously launching light to the individual fibers of the optical fiber bundle and for collecting return light from the optical fiber bundle.

Preferably a beam splitter or directional coupler is disposed proximal to the optical fiber bundle, for receiving light from the light source and transmitting the light to the optical fiber bundle, and for receiving return light from the optical fiber bundle and for transmitting the light to the light detector.

Preferably the first light path comprises one or more optical fibers. However, in other embodiments the first light path could comprise a beam path with or without beam steering optics rather than, or as well as at least one optical fiber.

Preferably a lens element or lens array is provided between the object and the distal end of the optical fiber bundle.

A further aspect of the invention concerns a scanning head which may be used in a confocal microscope.

This aspect of the invention may be said to reside in a scanning head for receiving light from a light source and for transmitting return light to a detector, the scanning head comprising:

a scanning means for causing a beam of light to scan an object;

a beam steering lens for focussing the light, the beam steering lens being displaced from an image plane at which the light focuses; and an objective lens for focussing the light on or in an object.

Since this aspect of the invention utilizes a beam steering lens which is displaced from the image plane scanning is performed asymmetrically (i.e. so that the lens is proximal to the image plane) thus eliminating detection of lens reflections. Furthermore, the scanning head may be dimensioned to fall within the range for minimum errors in scanning and flatness of field, without introducing added optics to correct for mirror separation.

Preferably a fiber output lens is arranged between the light source and the scanning means for focussing (in combination with the beam steering lens) the light beam at the image plane. The fiber output lens may be a standard microscope objective element, configured for its specific tube length, hence retaining resolution performance.

Preferably the image plane is on the object side of the beam steering lens such that the scanning head is the optical analogue of an eye piece, compatible with standard microscopes.

Preferably the scanning means comprises one or more scanning mirrors. However, in other embodiments other scanning devices such as acousto-optical devices could be utilised.

Preferably at least one optical fiber is provided between the light source and the fiber output lens for transmitting light from the light source to the fiber output lens.

Preferably a beam splitter or directional coupler is provided for directing the light from the light source to the scanning means and for directing return light from the scanning means to the light detector.

Preferred embodiments of the invention will be described, by way of example, with reference to the accompanying drawings in which.

Figure 1:
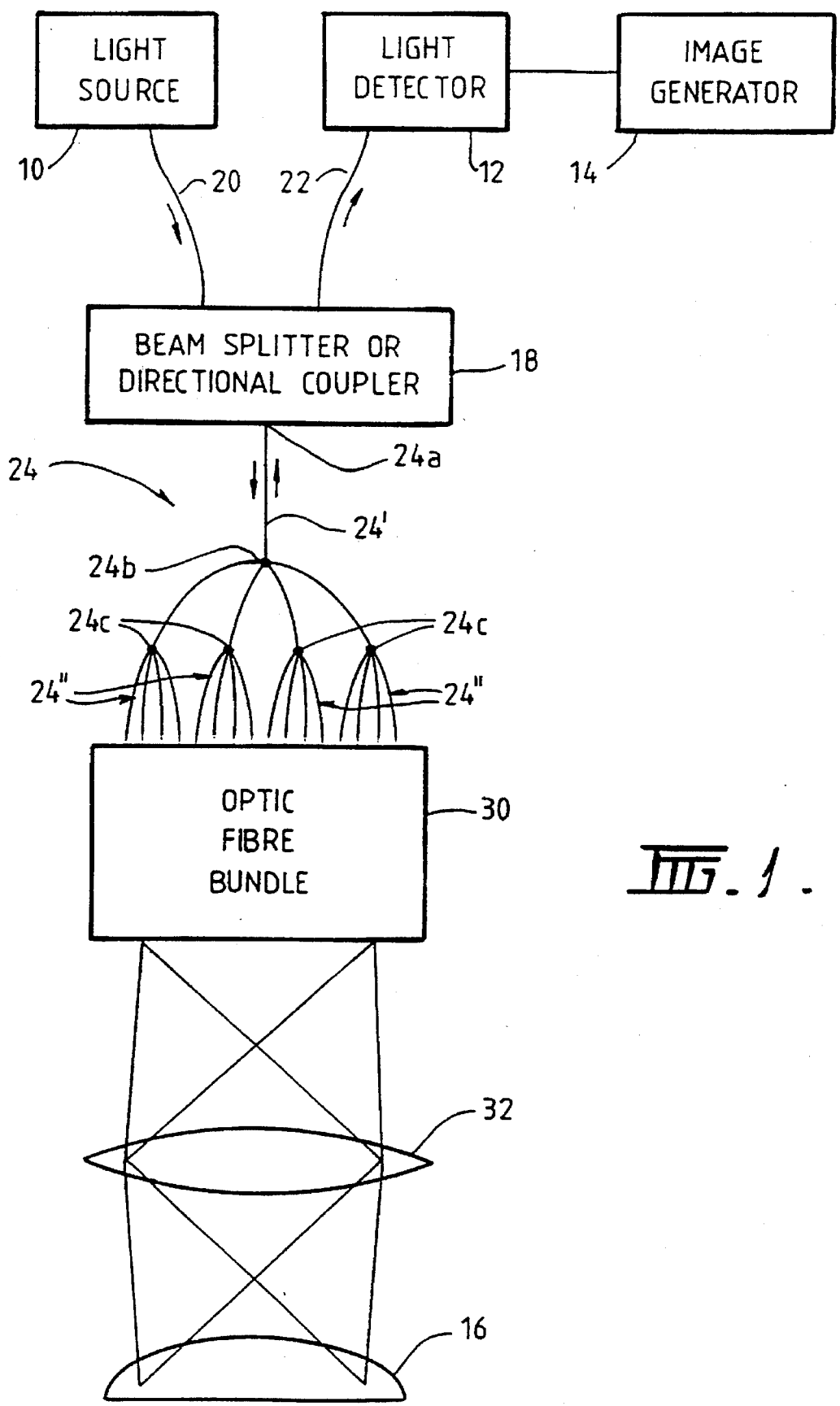
FIG. 1 is a view of a first embodiment of the invention.

With reference to figure I the confocal microscope comprises a light source 10 and a detector 12. The detector 12 may be coupled to a computerized image generator 14 for enabling an image of an object 16 to be formed on a television screen or the like.

The light source 10 is coupled to a beam splitter or directional coupler 18 by a first optical fiber 20 and the light detector 12 is connected to the beam splitter or directional coupler 18 by a second optical fiber 22.

The beam splitter or directional coupler 18 is connected to an array of switched optical fiber or waveguide tree couplers 24. The array of switched tree couplers 24 comprises a first tree coupler 24' which has a first end 24a and a plurality of branches 24b which have second ends 24c. Thus, the first tree coupler 24' has one fiber or connection in and "n" fibers or connections out. The first tree coupler may then be linked to a plurality of further tree couplers 24" and if necessary the second ends of the further tree couplers 24" may be yet connected to further tree couplers until the number of outputs from the array of tree couplers can be linked to (or form an integral part of) respective fibers in an optical fiber bundle 30 which includes a plurality of individual optical fibers (not shown). Thus, each individual optical fiber is connected to the output end of the array of tree couplers 24.

The tree couplers are switchable to enable light to pass through selected branches of the optical fiber or waveguide tree couplers so that light can be launched into selected individual optical fibers in the optical fiber bundle 30.

A lens or lens array 32 is arranged at the distal or object end of the optical fiber bundle 30 for focussing the light transmitted through the optical fiber bundle on or in the object 16. The return light from the object 16 which returns confocally from the object 16 may traverse the same pathway, as far as the beam splitter or directional coupler 18. The beam splitter or directional coupler 18 then directs the beam through the second optical fiber 22 to the light detector 12 for formation of an image of the object.

The image is generated by the light detector 12 and image generator 14 by switching the tree couplers 24', 24" in such a way that light is scanned across the focal plane on or within the object 16. Light returning confocally from the object can be detected virtually instantaneously after it has traversed the same pathway, as far as the beam splitter 18, on its return from the object or alternatively, an identical pattern of switching in the tree couplers 24', 24" can be generated which lags the original pattern so that light may be detected confocally a short time after it has illuminated the object. This technique is useful in real-time imaging of fluorescence objects because peak fluorescence occurs at a finite time after illumination of an object.

The light emerging from the distal end of the fiber bundle 30 may be diffraction limited.

In an alternative arrangement to that shown in FIG. 1, the optical fibers 20 or 22 could be replaced by a path with or without beam steering optics to form the first light path instead of using optical fibers.

Figures 2, 2A:
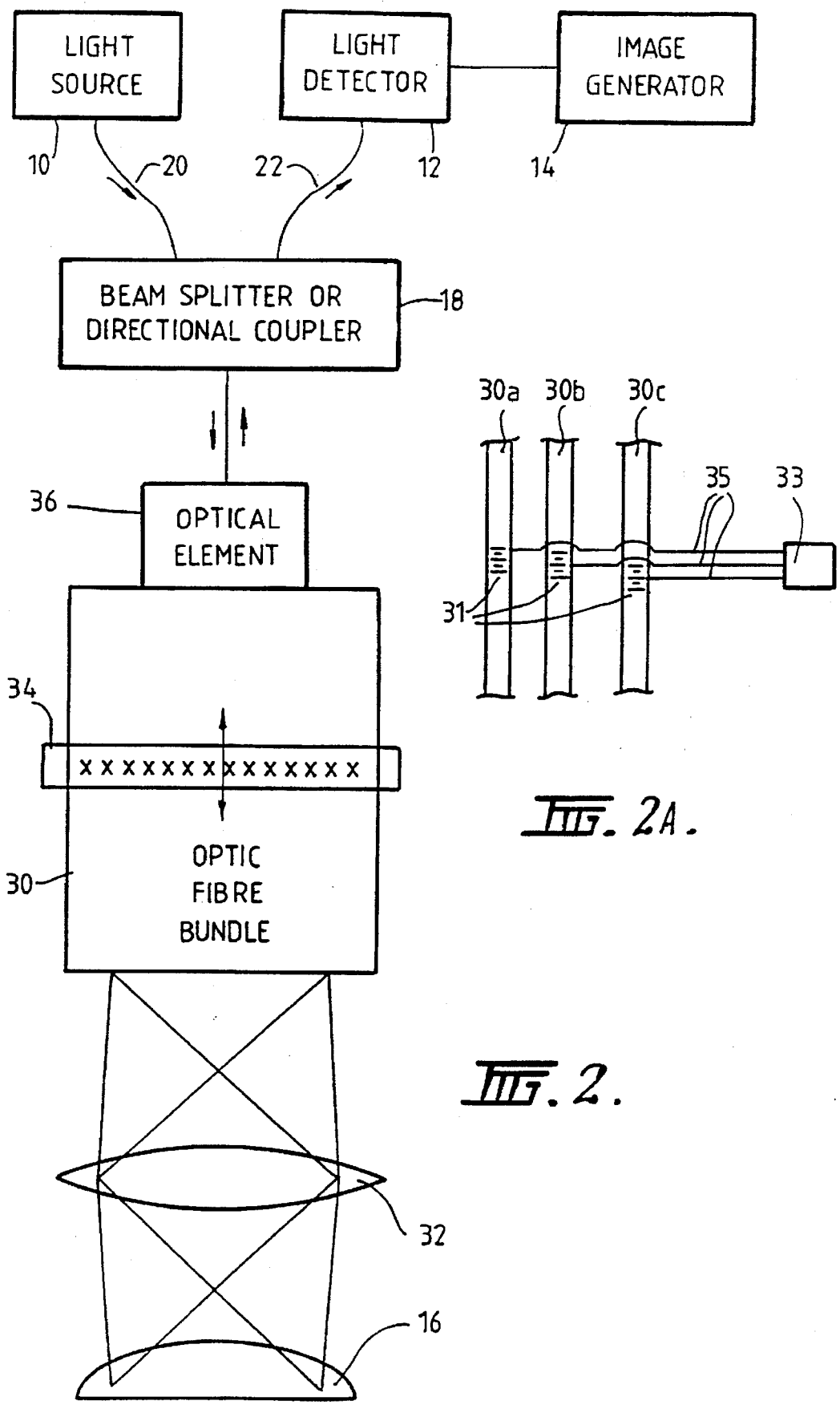
FIG. 2 is a view of the second embodiment of the invention.
FIG. 2A is a diagram illustrating control of the embodiments of FIGS. 1 and 2.

FIG. 2 shows a second embodiment of the invention in which like elements are represented by the same reference numerals to those in FIG. 1. In this embodiment of the invention the optical fiber bundle 30 is provided with fiber on-off switches 34 in the individual fibers of the optical fiber bundle so that the switches are effectively integral with the individual fibers in the bundle thereby doing away with the need for an array of switched tree couplers. Optical elements 36 such as lenses or the like may be provided at the proximal end of the optical fiber bundle 30 to simultaneously launch light into the individual optical fibers of the optical fiber bundle 30 which is received from the beam splitter or directional coupler 18.

The in-fiber on-off switches 34 may be optical, optoacoustic or electro-optic or other type of switches which either prevent, preferably with minimal reflection, or allow light to pass down a particular fiber. An example of in-fiber switching is given by Lytel-R. (1990) "Applications of Electro-optic Polymers to Integrated Optics", S.P.I.E., 1216, 30.

By means of in-fiber switching, at any one moment in time, light is allowed to pass down one or even several fibers of the bundle. As in FIG. 1, after light emerges from the distal end of a fiber in the optical fiber bundle 30 it is focussed on a point or spot on or within the object 16 and light returning confocally from the object may traverse the same pathway, as far as the beam splitter or directional coupler 18. By an appropriate pattern of switching within the bundle 30, scanning of light across the focal plane of the object may be achieved. The light may return from the object by the same path almost instantaneously or, as described above, the in-fiber switching my lag the original switching pattern.

Because the resolution of the image will be limited by the gaps between the individual fibers in the optical fiber bundles 30, in FIGS. 1 and 2 improved resolution my be obtained by movements (which could, for example, be quite small—e.g. of a similar magnitude as the distance between the adjacent fibers in the bundle) of the distal end of the optical fiber bundles 30 in relation to the object 16. This would allow scanning in the focal plane of the object to be less discrete and more continuous in nature. The movement could be either of the fiber bundle tip or of the object or of both.

As is shown in FIG. 2A, three optical fibers 30a, 30b and 30c of the optical fiber bundle 30 which including a optical, optoacoustic, electro-optic or other type of switch 31 which are electrically, optically or otherwise connected to a controller 33 (such as a computer or the like) for example by leads or connectors 35. Alternatively the controller could control optical switches by sending light to those switches (eg through the fiber optic bundle or array of tree couplers). The controller 33 applies output signals to the switches 31 to control the switches so that the switches either allow or prevent light to pass through the optical fiber 30a, 30b and 30c. A similar arrangement to that shown above may be used to control the switchable optical fiber or waveguide tree couplers described with reference to FIG. 1. Alternatively switchable waveguide tree couplers could form part of an integrated chip with optical and electronic components.

Figure 3:
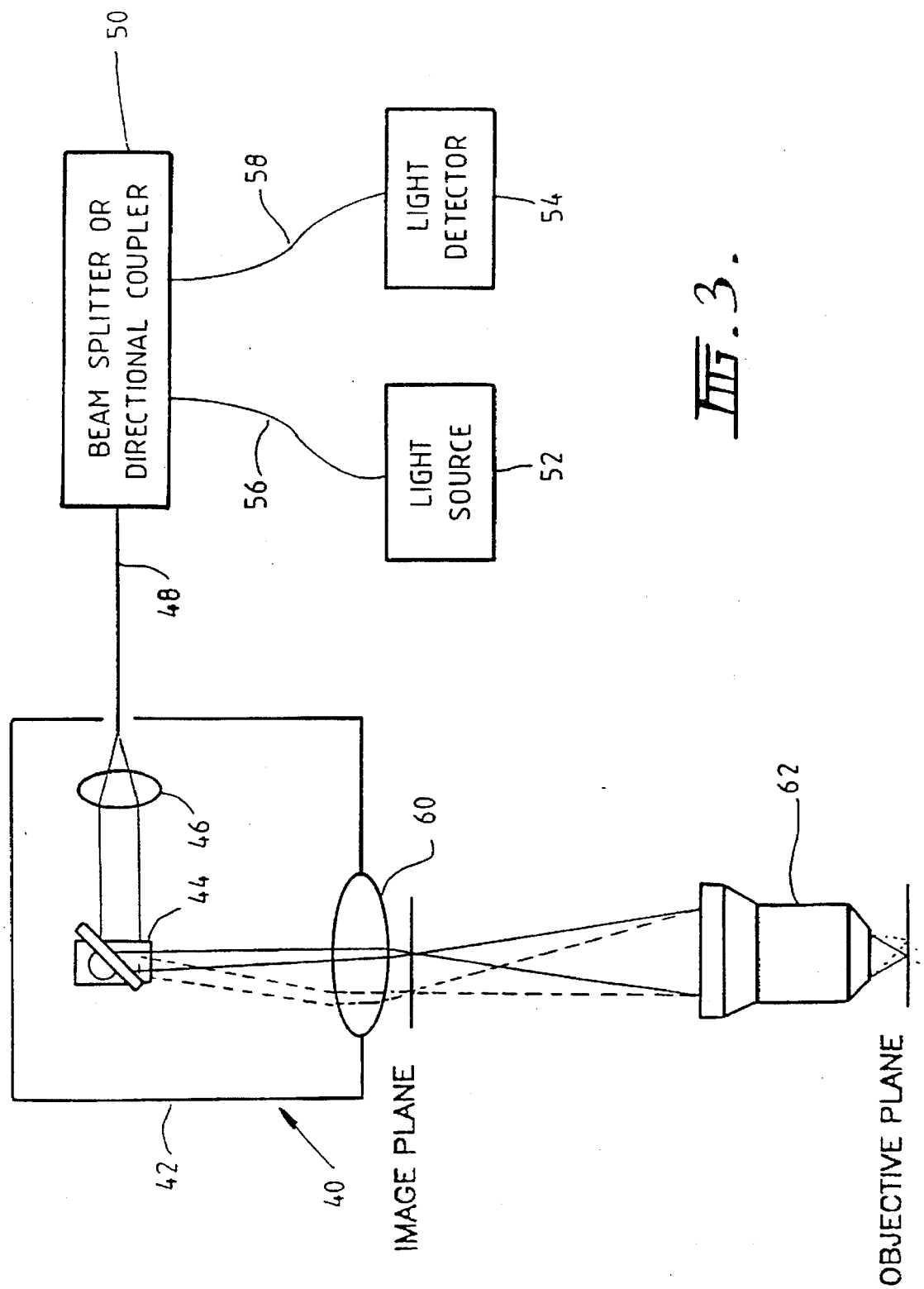
FIG. 3 is a view of a scanning head according to a further aspect of the invention.

FIG. 3 discloses a scanning head which is particularly useful in non-endoscopic applications of the microscope.

In FIG. 3 the scanning head comprises a head 42 which contains one or more scanning mirrors 44 and a fiber output lens 46 which receives light from an optical fiber or point source 48. The optical fiber or point source 48 is coupled to a beam splitter or directional coupler 50 which in turn is coupled to a light source 52 and light detector 54 by individual optical pathways or waveguides (such as optical fibers) 56 and 58.

The head 42 includes a beam steering lens 60. The beam steering lens 60 is displaced axially from an image plane of the lens 62 so that scanning is performed asymmetrically (i.e. so that the lens 60 is proximal to the image plane) thus eliminating detection of lens reflections. A microscope objective lens 62 is provided for focussing the light from the light source 52 on or in an object. Return light from the object is returned along the same path as the incident light as far as beam splitter 50 and is directed by beam splitter 50 to light detector 54 via pathway 58 for formation of an image.

Since the scanning head performs scanning asymmetrically in relation to the beam steering lens 60 problems inherent in symmetrical designs in which there may be problems of confocal return from the lens and aberrations due to the lens elements being at suboptimal separations are eliminated.

The fiber output lens 46 is a standard microscope objective element, configured for its specified tube length, hence retaining resolution performance. The image is projected below the beam steering lens such that the scanning head is the optical analogue of an eyepiece, compatible with standard microscopes. The dimensions achieved fall within the range of minimum errors in scanning and flatness of field, without introducing added optics to correct for minor separation.

Since modifications within the spirit and scope of the invention may readily be effected by persons skilled within the art, it is to be understood that this invention is not limited to the particular embodiment described by way of example hereinabove.

The claims defining the invention are as follows:

1. A confocal microscope comprising:

a light source;

an optical fiber bundle defining a plurality of optical channels for receiving light from the light source and for transmitting the light to an object and for allowing light to return from the object through the optical fiber bundle;

switching means for selectively switching selected fibers in the optical fiber bundle so as to allow light to selectively be transmitted and returned through individual optical channels until an image of the object is produced; and a detector for receiving returned light from the optical fiber bundle to enable the image of the object to be produced.

2. The microscope of claim 1 wherein the switching means comprises a plurality of switchable optical fiber or waveguide tree couplers, the plurality of tree couplers having a first end which receives light from a first light path and a plurality of second ends which are coupled to or integral with respective fibers of the fiber bundle.

3. The microscope of claim 1 wherein the switching means comprises a plurality of switches in the respective fibers of the optical fiber bundle.

4. The microscope of claim 3 wherein an optical element is provided at an image end of the optical fiber bundle for simultaneously launching light to the individual fibers of the optical fiber bundle and for collecting return light from the optical fiber bundle.

5. The microscope of claim 1 wherein a beam splitter or directional coupler is disposed proximal to the optical fiber bundle, for receiving light from the light source and transmitting the light to the optical fiber bundle, and for receiving return light from the optical fiber bundle and for transmitting the light to the light detector.

6. The microscope of claim 1 wherein the first light path comprises one or more optical fibers.

7. The microscope of claim 1 wherein a lens element or lens array is provided between the object and the distal end of the optical fiber bundle.

8. The microscope of claim 1 wherein the switching means switches the selected fibers to scan light across a region of the object to be imaged.

9. The microscope of claim 8 wherein the switching means switches the selected fibers in sequence to scan light across the region of the object to be imaged.

10. The microscope of claim 1 wherein the switching means switches the selected fibers to scan light across the object in accordance with a selected pattern and, after a selected time lag, switches the selected fibers to scan light across the object in accordance with the same selected pattern.

* * * * *